United States Patent
Goodzeit et al.

(10) Patent No.: US 6,629,672 B1
(45) Date of Patent: Oct. 7, 2003

(54) SUN SENSOR ALIGNMENT COMPENSATION SYSTEM

(75) Inventors: Neil Evan Goodzeit, Princeton, NJ (US); Xipu Li, San Jose, CA (US)

(73) Assignee: Lockheed Martin Corporation, Bethesda, MD (US)

(*) Notice: Subject to any disclaimer, the term of this patent is extended or adjusted under 35 U.S.C. 154(b) by 118 days.

(21) Appl. No.: 10/092,636

(22) Filed: Mar. 8, 2002

(51) Int. Cl.[7] ............................................... B64G 1/36
(52) U.S. Cl. ........................ 244/171; 701/13; 342/355
(58) Field of Search ................................ 244/164, 171; 701/13; 340/974; 342/355, 356

(56) References Cited

U.S. PATENT DOCUMENTS

| | | | |
|---|---|---|---|
| 4,062,509 A | * 12/1977 | Muhlfelder et al. | 244/166 |
| 4,071,211 A | * 1/1978 | Muhlfelder et al. | 244/165 |
| 4,537,375 A | 8/1985 | Chan | 244/171 |
| 5,556,058 A | * 9/1996 | Bender | 244/171 |
| 5,806,804 A | 9/1998 | Goodzeit et al. | 244/169 |
| 6,026,337 A | 2/2000 | Krigbaum et al. | 701/13 |
| 6,381,520 B1 | * 4/2002 | Higham et al. | 701/13 |

* cited by examiner

Primary Examiner—Robert P. Swiatek
(74) Attorney, Agent, or Firm—Swidler Berlin Shereff Friedman, LLP

(57) ABSTRACT

A method for correcting differences in measurements between sensors. Misalignment of a roll error of a sun sensor alignment is estimated with respect to a reference roll value measured by an earth sensor. Sun sensor assembly elevation angle residual is calculated utilizing the estimated sun sensor assembly roll misalignment. A yaw attitude of the spacecraft is updated based upon the calculated sun sensor assembly elevation residual.

13 Claims, 16 Drawing Sheets

SUN SENSOR ALIGNMENT COMPENSATION SYSTEM

FIELD OF THE INVENTION

The present invention relates to spacecraft attitude control. In particular, the present invention relates to a method and system for detecting and correcting spacecraft yaw errors due to sun sensor alignment uncertainty.

BACKGROUND OF THE INVENTION

Accurately maintaining spacecraft attitude pointing is critical to payload communication performance. To achieve this goal, the on-board control system first has to accurately determine the spacecraft's actual attitude in space using data from on-board sensors such as the earth sensor, the sun sensor, or the star tracker. Since sensor data is used as the reference for spacecraft attitude determination, the accuracy of the sensor alignments has a significant effect on the spacecraft's attitude determination performance.

Errors always exist in sensor alignments. Common error sources include measurement errors introduced during the manufacturing phase, sensor alignment shifts that occur during the launch, and thermal distortions while in orbit. Because each sensor will have a different alignment error, different sensors can produce conflicting information. As a result, attitude determination performance will be degraded and an attitude disturbance will be produced.

It is desirable to have a system that can estimate such sensor alignment uncertainties and compensate for the errors introduced. Since the alignment uncertainties can be time varying, an on-board estimation-compensation system is necessary. With such a system, spacecraft pointing performance is greatly improved.

SUMMARY OF THE INVENTION

The present invention provides a method for correcting differences in measurements between sensors. According to the method, misalignment of a roll error of a sun sensor alignment is estimated with respect to a reference roll value measured by an earth sensor. Sun sensor assembly elevation angle residual is calculated utilizing the estimated sun sensor assembly roll misalignment. A yaw attitude of the spacecraft is updated based upon the calculated sun sensor assembly elevation residual.

The present invention also includes a spacecraft attitude control system that includes a controller operable to carry out the above-described method and at least one element operable to alter the yaw attitude of the spacecraft.

Still other objects and advantages of the present invention will become readily apparent by those skilled in the art from a review of the following detailed description. The detailed description shows and describes preferred embodiments of the present invention, simply by way of illustration of the best mode contemplated of carrying out the present invention. As will be realized, the present invention is capable of other and different embodiments and its several details are capable of modifications in various obvious respects, without departing from the invention. Accordingly, the drawings and description are illustrative in nature and not restrictive.

BRIEF DESCRIPTION OF THE DRAWINGS

Objects and advantages of the present invention will be more clearly understood when considered in conjunction with the accompanying drawings, in which.

DETAILED DESCRIPTION OF THE INVENTION

The present invention provides an effective real-time system to estimate and compensate for the alignment errors between individual on-board spacecraft sensors. The method is designed as an extension to the commonly used Kalman Filter attitude determination system. It can be easily incorporated into existing flight software.

To estimate and compensate for the alignment errors, the present invention includes an estimator that calculates the sun sensor alignment error relative to the earth sensor's alignment. It decomposes the sun elevation residual, a Kalman Filter variable, along the spacecraft yaw and roll axes. The estimation of the alignment uncertainty is optimal in the least-square sense and performed using sequential elevation residual measurements. Significantly, the method according to the present invention requires minimum memory storage.

The present invention also provides a real-time compensation scheme that calibrates the sun sensor to the spacecraft body alignment based on output from the estimator.

Although the present invention is described in the context of a geo-synchronous satellite with baseline earth sensor and sun sensor configuration, the concept and implementation apply to most spacecraft attitude determination systems that use multiple sensors.

Figure 1:
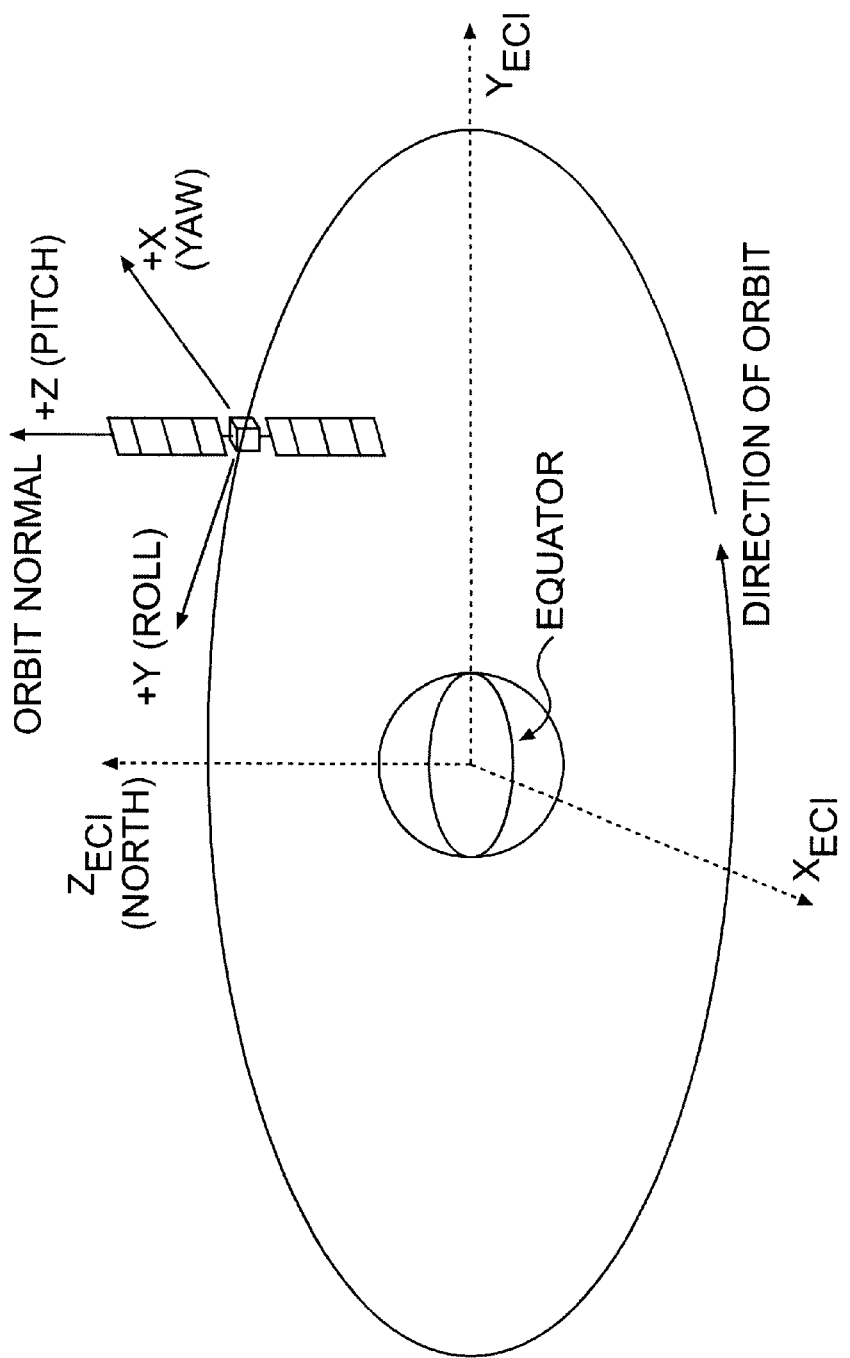
FIG. 1 represents a diagram illustrating a typical earth and spacecraft coordinate systems.

FIG. 1 illustrates a nominal spacecraft attitude for a typical geo-synchronous spacecraft. The spacecraft yaw axis (x) is aligned with the Zenith vector, which is the vector directed from the center of the Earth towards the spacecraft. The roll axis (y) of the spacecraft is aligned with the spacecraft velocity vector, which is directed in the eastward direction as a tangent to the spacecraft orbit. The spacecraft pitch axis (z) is aligned with the orbit normal vector, which is directed in the northward direction. FIG. 1 also illustrates the earth coordinate system.

Figure 2:
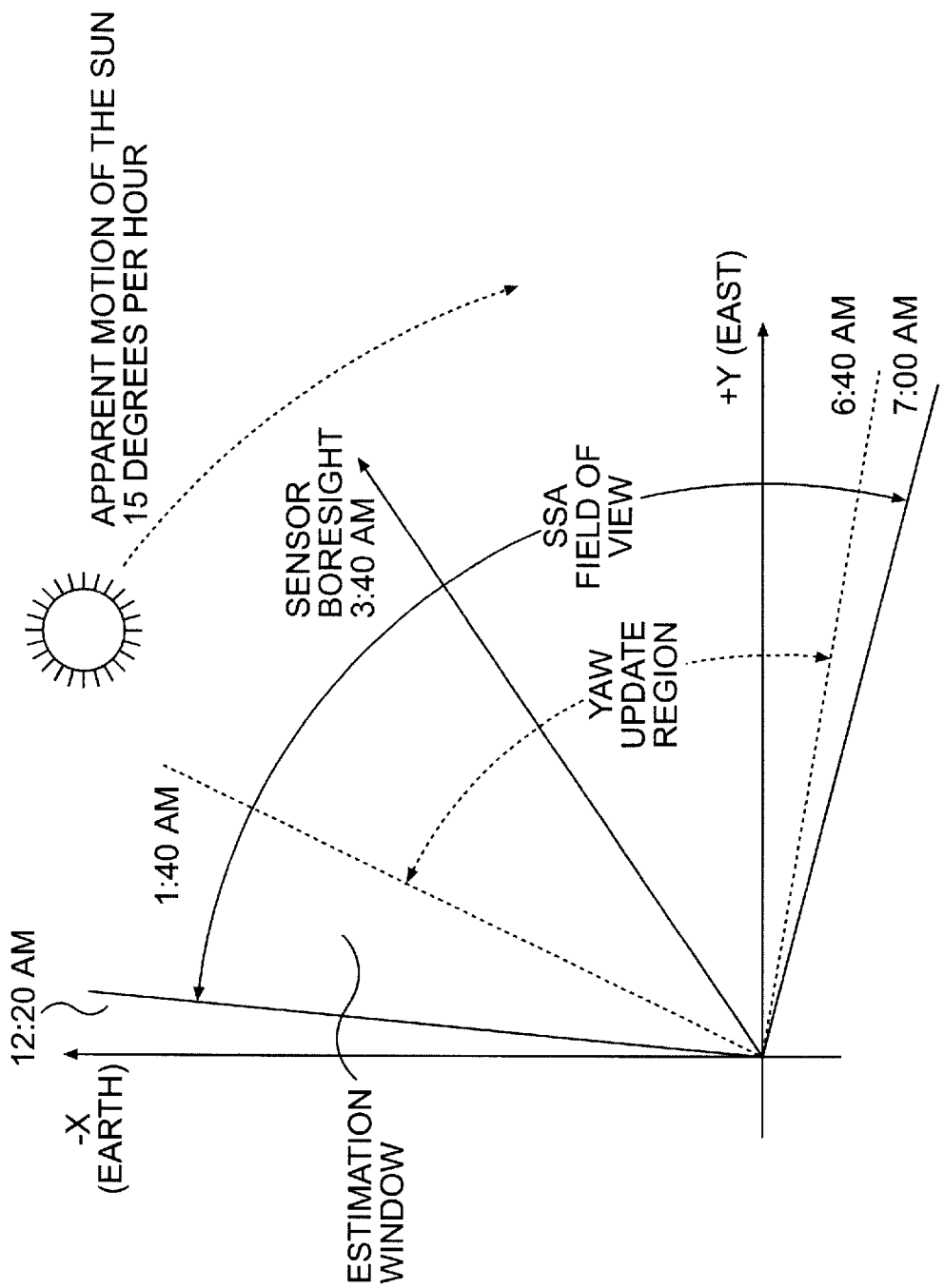
FIG. 2 represents a diagram illustrating the sun sensor alignment estimation window and field of view.

The earth sensor assembly (ESA) is typically mounted on the earth-facing panel with its boresight aligned with the minus x-axis. On the other hand, the sun sensor assembly (SSA) is typically mounted on the East side of the earth-facing panel with its boresight 55 degrees from the minus x-axis towards the East. FIG. 2 illustrates this is greater detail.

In FIG. 2, the spacecraft is located at the intersection of the X and Y axes. If the sun sensor has a ±50 degree field of view (FOV), the SSA sees the sun between about 12:20 AM and about 07:00 AM spacecraft local time each day. In order to more fully determine a spacecraft's attitude, the on-board system typically needs two well-separated reference vectors, namely the earth and sun vectors in this case. Roughly speaking, the attitude determination system uses the earth sensor information to update its roll and pitch attitude and uses the sun sensor information to update its yaw attitude.

Figure 3:
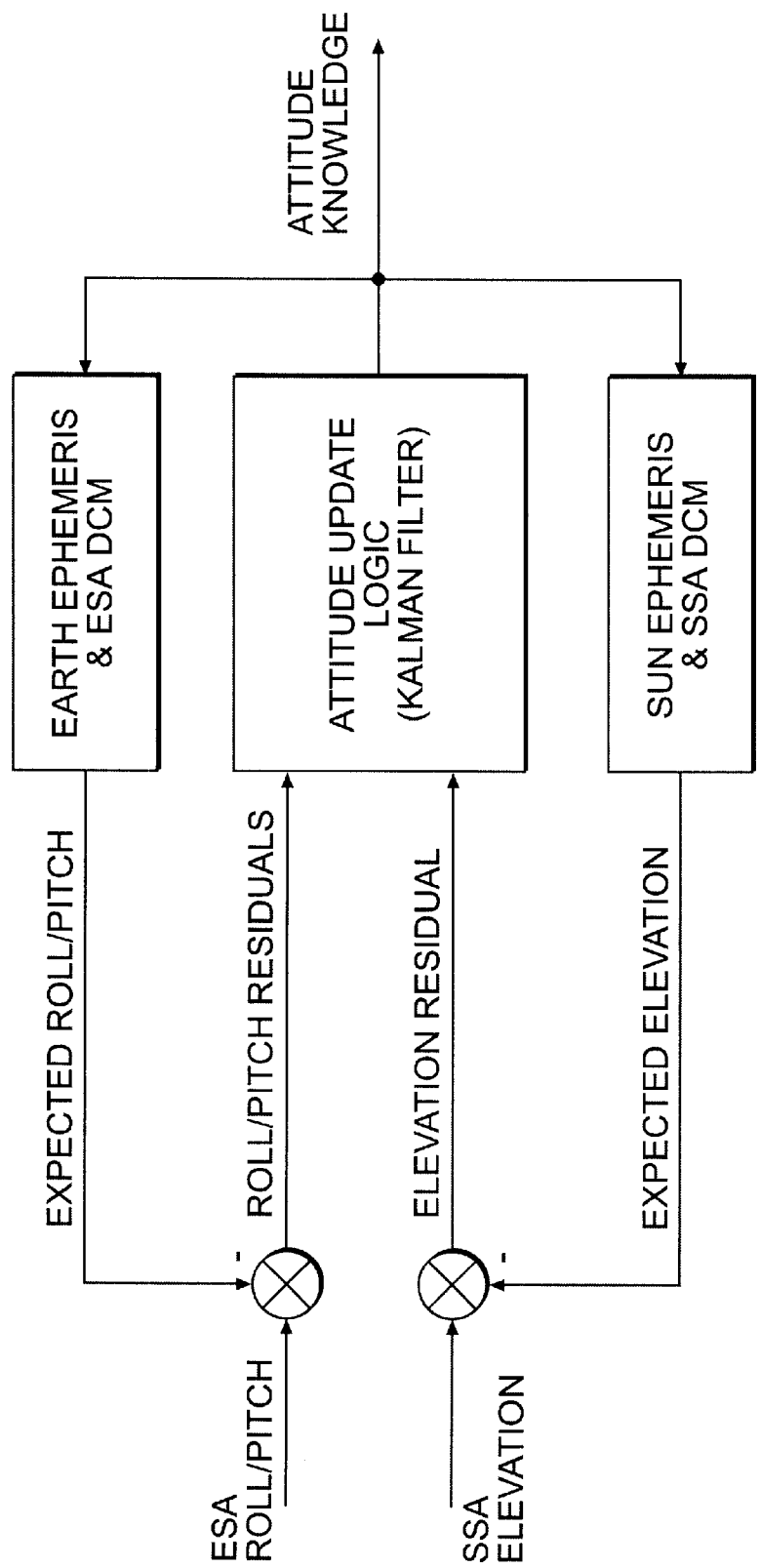
FIG. 3 represents a diagram illustrating a typical known attitude determination logic.

FIG. 3 represents a block diagram that illustrates typical attitude determination logic. According to this logic, the expected measurements are calculated based on on-board attitude knowledge and the nominal sensor to spacecraft body direction cosine matrices (DCM). As a result, the measurement residuals, which are defined as the difference between expected sensor measurements and actual sensor measurements, represent the errors in the attitude knowledge. These measurement residuals are used by the Kalman Filter to correct the attitude knowledge.

Because the Earth is in constant view of the ESA, the roll and pitch attitude is updated continuously. However, the yaw attitude can only be updated for 5 hours each day when the sun is in its update window. When the sun is outside the update window, which occurs for a 19-hour period each day, the yaw attitude knowledge is propagated using the gyro measured spacecraft angular rates. It should be noted that, as shown in FIG. 2, although the sun enters the SSA FOV at 12:20 AM spacecraft local time, it is not used for the yaw attitude update until 1:40 AM. Selecting the sun update window this way is to ensure that the sun and earth vectors are well separated before the sun vector is used for the yaw attitude update. As discussed below, it is this period of time between 12:20 AM to 1:40 AM where the SSA alignment error estimation according to the present invention will be performed. The sun sensor alignment estimated during this interval is applied to correct the sun sensor elevation residuals between 1:40 AM and 6:40 AM. The correction is made prior to inputting the residuals into the Kalman filter to determine the spacecraft three-axis attitude and gyro biases. Using the corrected elevation residual prevents the ESA-to-SSA roll alignment uncertainty from corrupting the yaw attitude estimate. By eliminating this corruption, the spacecraft yaw pointing is improved.

For the prior art system described previously, a yaw attitude transient typically occurs at the beginning of the sun update window each day. In fact, transients have been observed for a particular spacecraft ranging from about 0.5 degrees to less than about 0.1 degrees. The transient varies from spacecraft to spacecraft and from season to season.

This daily transient is caused by two factors. The first factor is the yaw attitude determination error that is accumulated outside the sun update window due to random gyro drift. The second factor is the SSA alignment error relative to the ESA. The inconsistency in the sensor alignments causes conflicting information in the data between the ESA and the SSA in the roll direction. As a result, the sun elevation residual, which is used for the yaw update, is affected by the error. The transient caused by the second factor will degrade spacecraft attitude control performance, and therefore is undesirable.

At least two issues exist with respect to the error in the above-described system. First, the alignment uncertainty between the ESA and the SSA is time-varying and mainly caused by seasonal thermal distortions. Second, on-orbit data shows that the SSA alignment uncertainty contributes much more to the yaw transient than the gyro drift does. Therefore, as carried out according to the present invention, adding an autonomous SSA misalignment estimation and correction function to a spacecraft's attitude determination system is desirable and will improve the yaw attitude pointing performance.

The above-described errors are inherent in spacecraft operations. Existing spacecraft do not include means for detecting and correcting these errors. As a result, the error is normally included in the error budget, compromising the spacecraft's performance requirement.

The error estimation and correction system in this invention is based on the following mathematical analysis. The SSA alignment error estimation equation is:

$$y(t) = H(t)x(t) \qquad (1a)$$

$$H(t) = [-\sin \alpha(t) -\cos \alpha(t)] \qquad (1b)$$

$$x = \begin{bmatrix} \theta_x \\ \theta_y \end{bmatrix} \qquad (1c)$$

where y(t) is the sun sensor elevation residual, $\theta_x$ and $\theta_y$ are attitude determination errors in the yaw and roll axis, respectively, H(t) is the sensitivity matrix of the Kalman Filter logic, and $\alpha(t)$ is the sun vector angle (in the yaw/roll plane) from the minus x axis. Since the roll attitude knowledge is gained from the ESA roll measurement, $\theta_y$ is treated as solely a result from the SSA roll alignment error.

In other words, the sun elevation residual is contributed by two elements: yaw attitude determination error, which is mainly caused by the gyro drift, and roll attitude determination error, which is caused by SSA alignment error relative to the ESA. While the yaw error $\theta_x$ needs to be corrected, the roll error $\theta_y$, which generates conflicting information compared to data from the ESA, must not be permitted to affect yaw attitude determination accuracy.

Equations (1a), (1b) and (1c) may be utilized to solve for $\theta_y$ as follows. An array of data points may be collected sequentially when the sun is inside the SSA estimation window, which is defined between 12:20 AM and 1:40 AM spacecraft local time, as shown in FIG. 2. Using multiple samples of the sun sensor elevation residual, and the sensitivity matrix at each time step, the problem becomes over-determined and can be solved by the least-square method.

$$\begin{bmatrix} y_1 \\ y_2 \\ \ldots \\ y_k \end{bmatrix} = \begin{bmatrix} H_1 \\ H_2 \\ \ldots \\ H_k \end{bmatrix} * \begin{bmatrix} \theta_x \\ \theta_y \end{bmatrix} \qquad (2)$$

where k is the number of sample points. The solution for $\theta_y$ can be expressed as:

$$\theta_y = [01](H^T H)^{-1} H^T y \qquad (3a)$$

where $$H = \begin{bmatrix} H_1 \\ H_2 \\ \ldots \\ H_k \end{bmatrix}_{k \times 2} \quad (3b)$$

$$y = \begin{bmatrix} y_1 \\ y_2 \\ \ldots \\ y_k \end{bmatrix}_{k \times 1} \quad (3c)$$

where $\theta_y$ is an estimate of the SSA roll alignment uncertainty $\theta_y$ based on the k data points collected in the alignment error estimation window. Note that in this expression, $(\cdot)^T$ denotes the matrix transpose. Also, it should be noted that in Eq.(3a) the matrices $H^T H$ and $H^T y$ are only 2×2 and 2×1, respectively. Therefore, it is easy to implement the computations in the on-board spacecraft processor. First, inverting $H^T H$ in the flight software is trivial. Second, there is no need to store k points of data in the on-board computer; instead, Equation 3 can be solved sequentially, or recursively, as follows.

Let $C=H^T H$ and $D=H^T y$, then at the $k^{th}$ sampling point, C and D can be modified using the values of these matrices from the previous sampling interval as $$C(1,1)=C(1,1)*f+H_k(1)*H_k(1) \quad (4a)$$

$$C(1,2)=C(1,2)*f+H_k(1)*H_k(2) \quad (4b)$$

$$C(2,1)=C(1,2) \quad (4c)$$

$$C(2,2)=C(2,2)*f+H_k(2)*H_k(2) \quad (4d)$$

$$D(1)=D(1)+H_k(1)*y_k \quad (4e)$$

$$D(2)=D(2)+H_k(2)*y_k \quad (4f)$$

With C and D initialized to zero matrices, Equations (4a), (4b), (4c), (4d), (4e), and (4f) are standard matrix multiplication algorithms if f is selected as 1. In the method according to the present invention, f serves as a "forgetting factor" that makes the estimator forget the old data as more data comes in. In other words, more weight is given to the newer data so the estimator will be able to track changes in $\theta_y$. This is necessary since the estimation system is designed to run continuously without re-initializing C and D matrices at every entry to the SSA estimation window. The forgetting factor is a number less than but close to 1, so that $f^k \to 0$ as $k \to \infty$.

The forgetting factor places more emphasis on current data and less emphasis on older data. For example, if the forgetting factor is 0.9, then the current sampled data is weighted as 1.0. But previously sampled data is weighted only 0.9 and the data from two samples earlier is weighted at $9^2=0.81$. The data from eight samples ago is weighted as $0.9^7=0.4783$. Therefore, as time passes, aged data will become less and less of a factor. This method may be utilized to track the changes of the $\theta_y$.

According to one embodiment of a method of the present invention, the forgetting factor may be selected as 0.9999, which is based on the orbit data and experience. The forgetting factor is a design parameter and is adjustable.

Using the estimated roll error of the SSA alignment, the SSA elevation residual can be adjusted using Equation (5) before it is used to update the yaw attitude by the Kalman filter logic $$y_{k+1} = y_{k+1} - H_{k+1}(2)\theta_{y,k}$$

Figure 4:
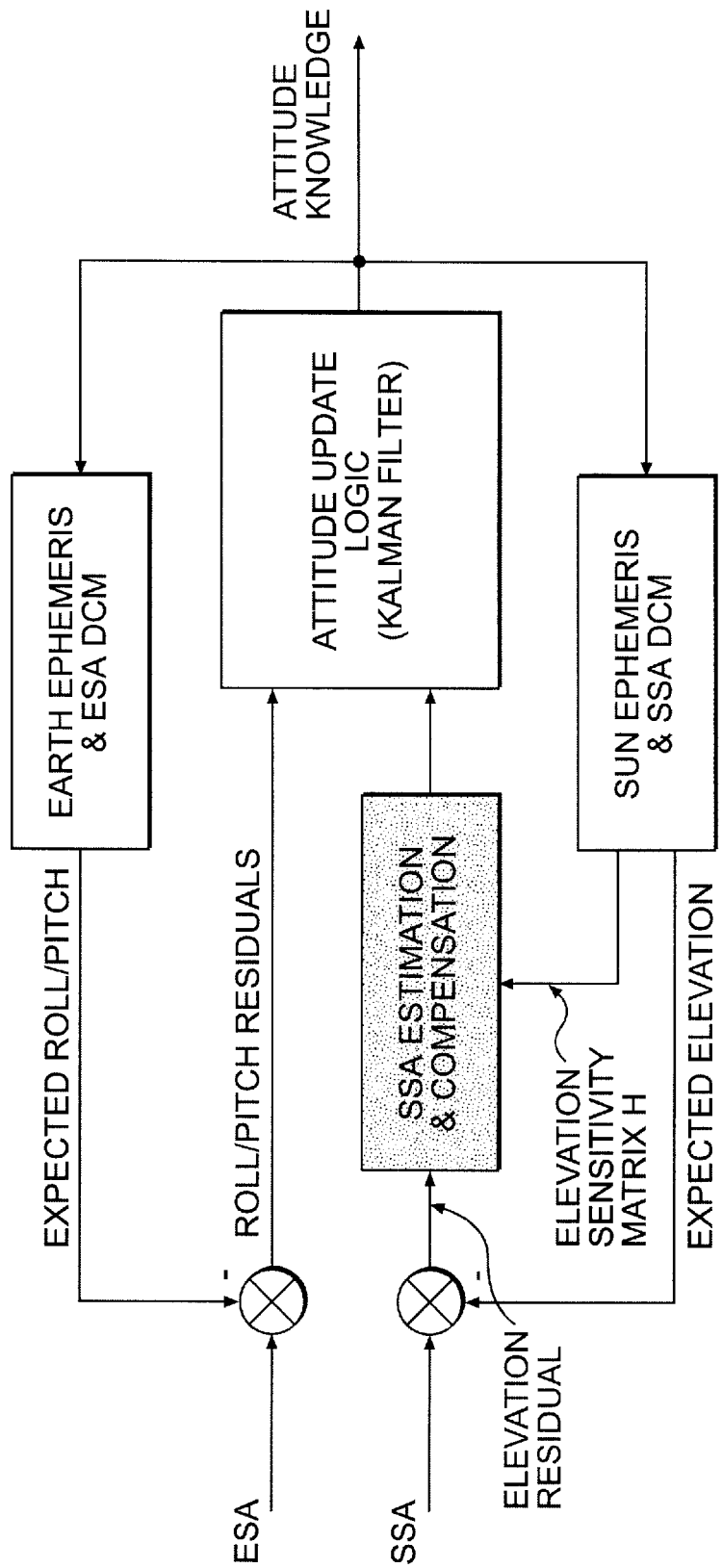
FIG. 4 represents a diagram illustrating an embodiment of an attitude determination logic according to the present invention.

The residual is corrected using this expression at all time steps k within the yaw update interval (nominally 1:40 AM to 6:40 AM spacecraft local time), using $\theta_y$ calculated at the end of the misalignment estimation window. This is equivalent to directly correcting the SSA to body DCM using $\theta_y$, and using the corrected DCM to calculate the SSA elevation residual prior to Kalman filtering. The logic illustrated in FIG. 4 includes a SSA alignment error estimation and compensation system according to the invention.

According to an alternative embodiment, the estimation window is eliminated and the SSA roll alignment uncertainty is estimated concurrently with Kalman filtering and yaw estimation. According to this approach, the alignment uncertainty may be included as a separate state in the Kalman filter, and error dynamics modeled with a random walk. This alternative embodiment is directly anticipated from the above discussion of the misalignment estimation.

Figure 5A:
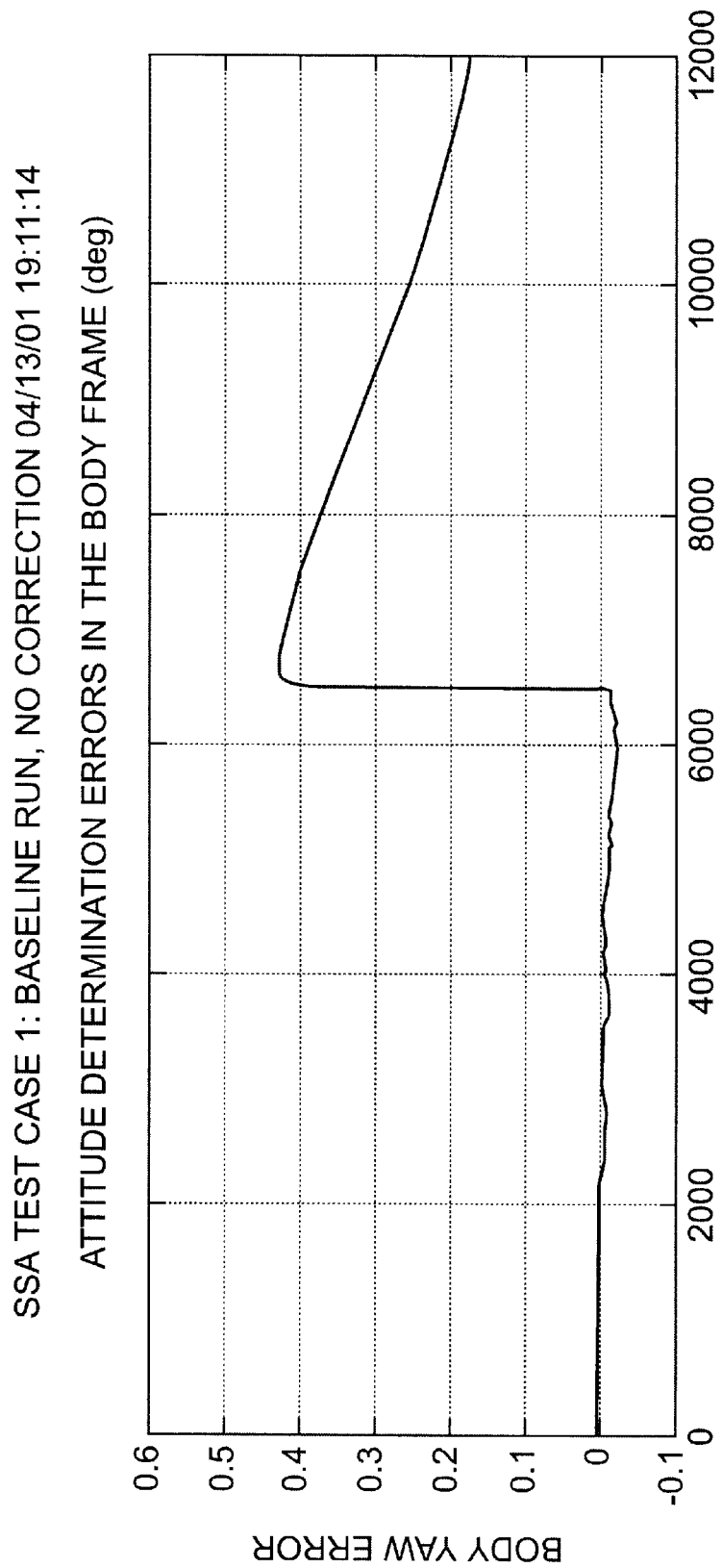
FIGS. 5a, 5b and 5c represent graphs illustrating body yaw, body roll and body pitch attitude determination error and time, respectively, for a simulation in which 0.2 degrees of sun sensor alignment error has been introduced.
Figure 5B:
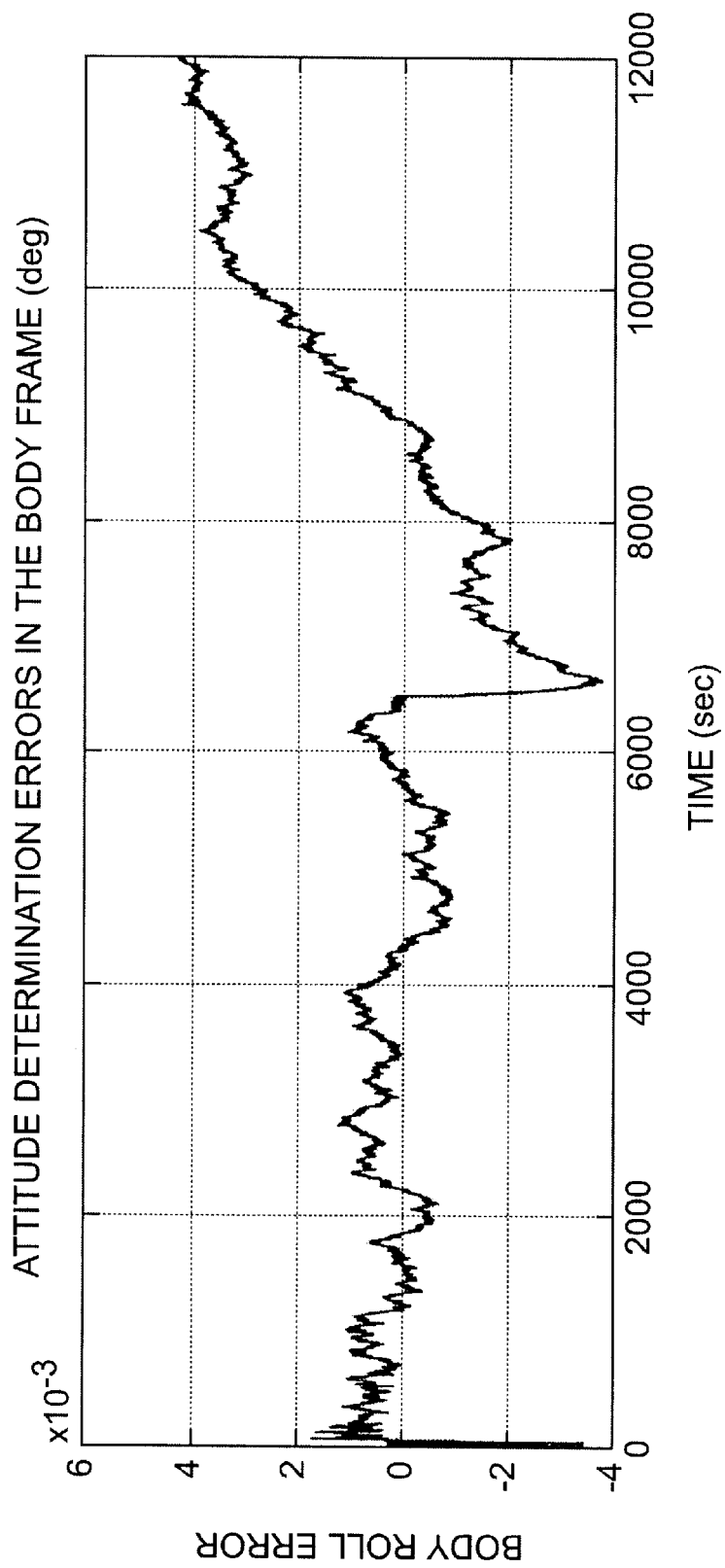
Figure 5C:
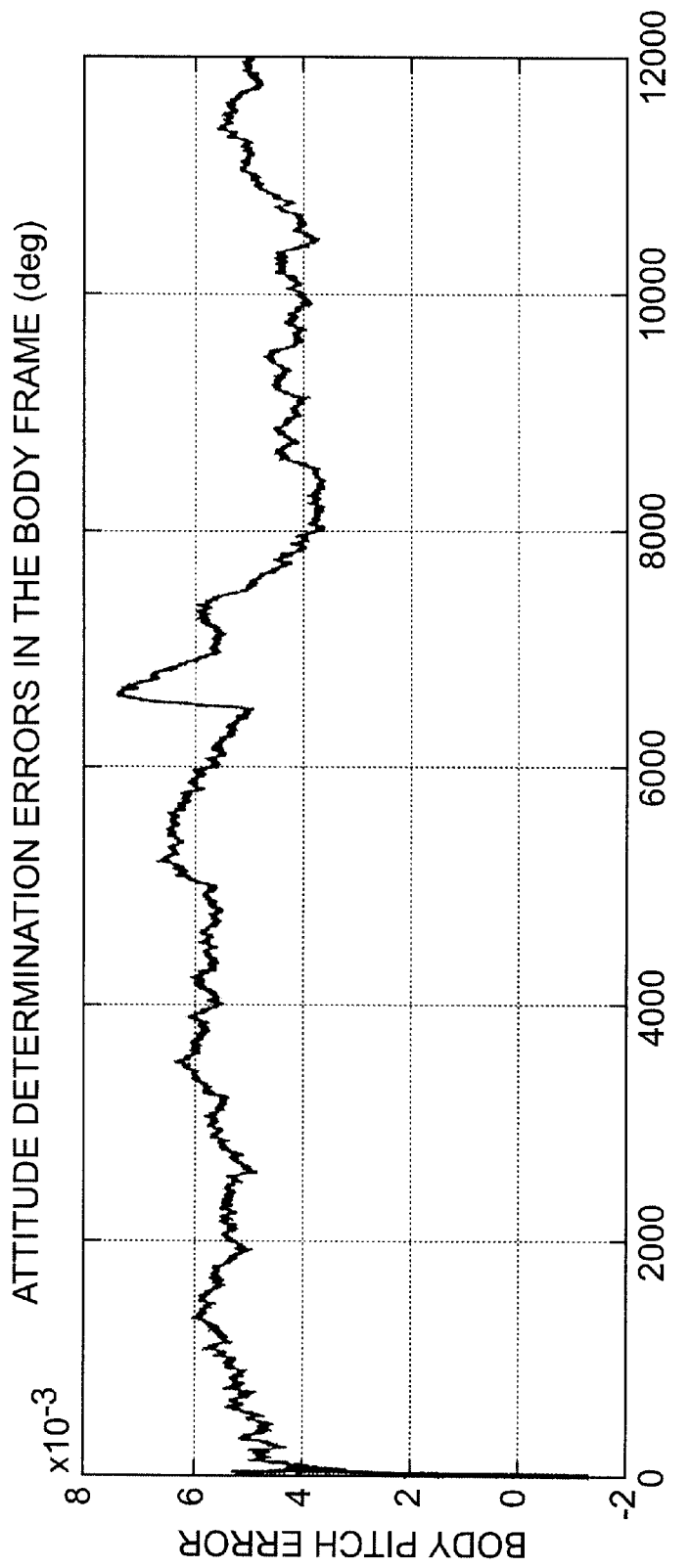
Figure 6A:
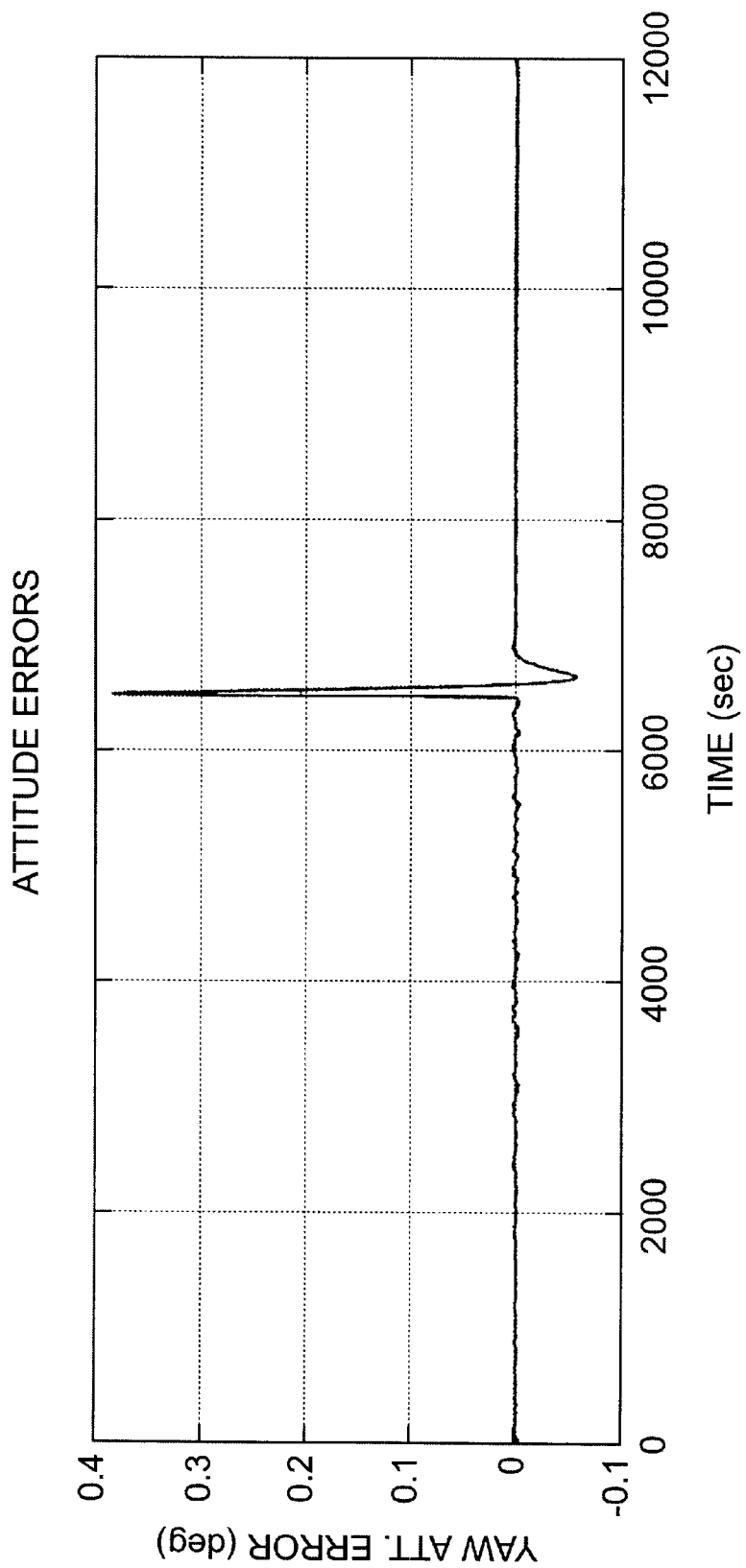
FIGS. 6a, 6b and 6c represent graphs illustrating body yaw, body roll and body pitch attitude determination error and time, respectively, utilizing a known attitude determination logic.
Figure 6B:
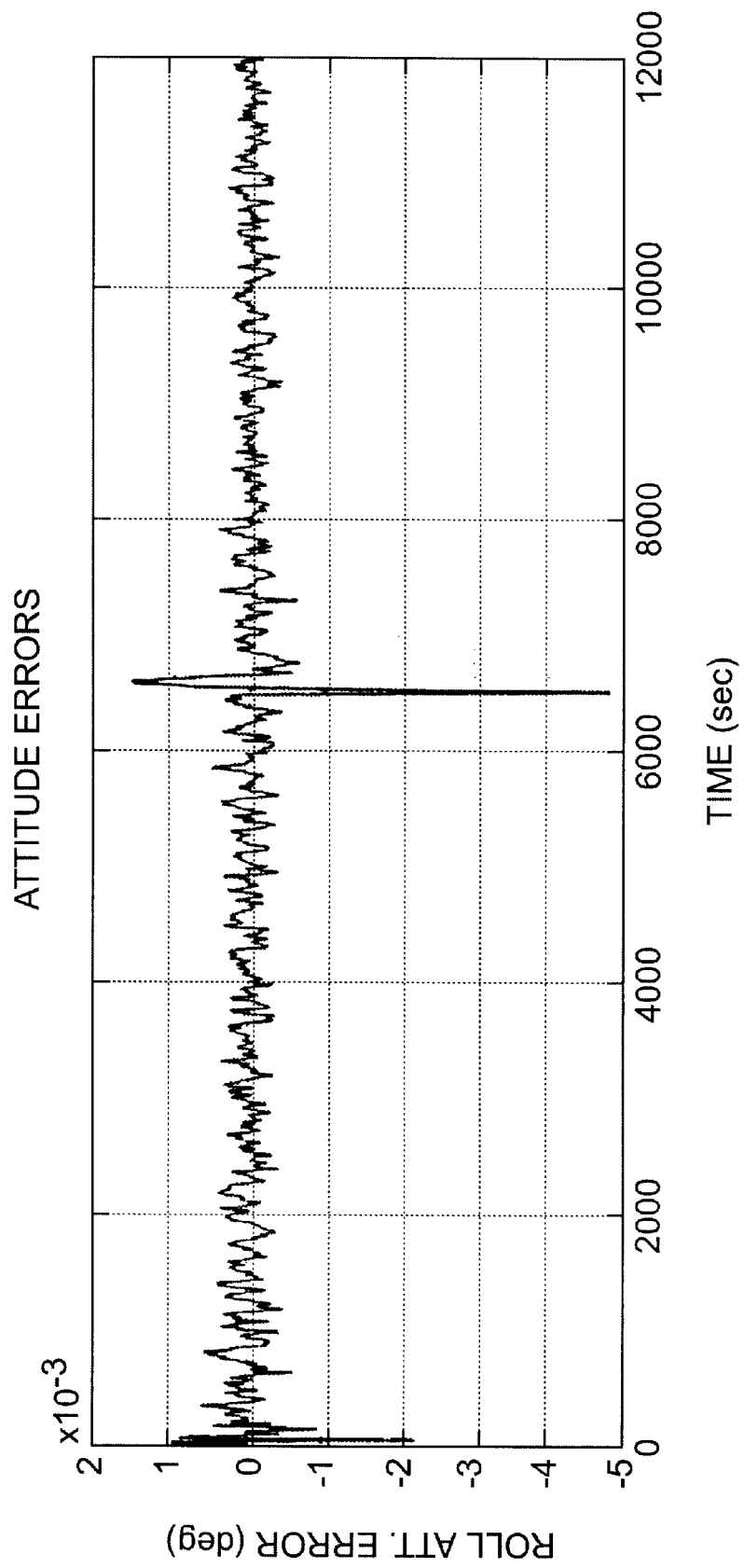
Figure 6C:
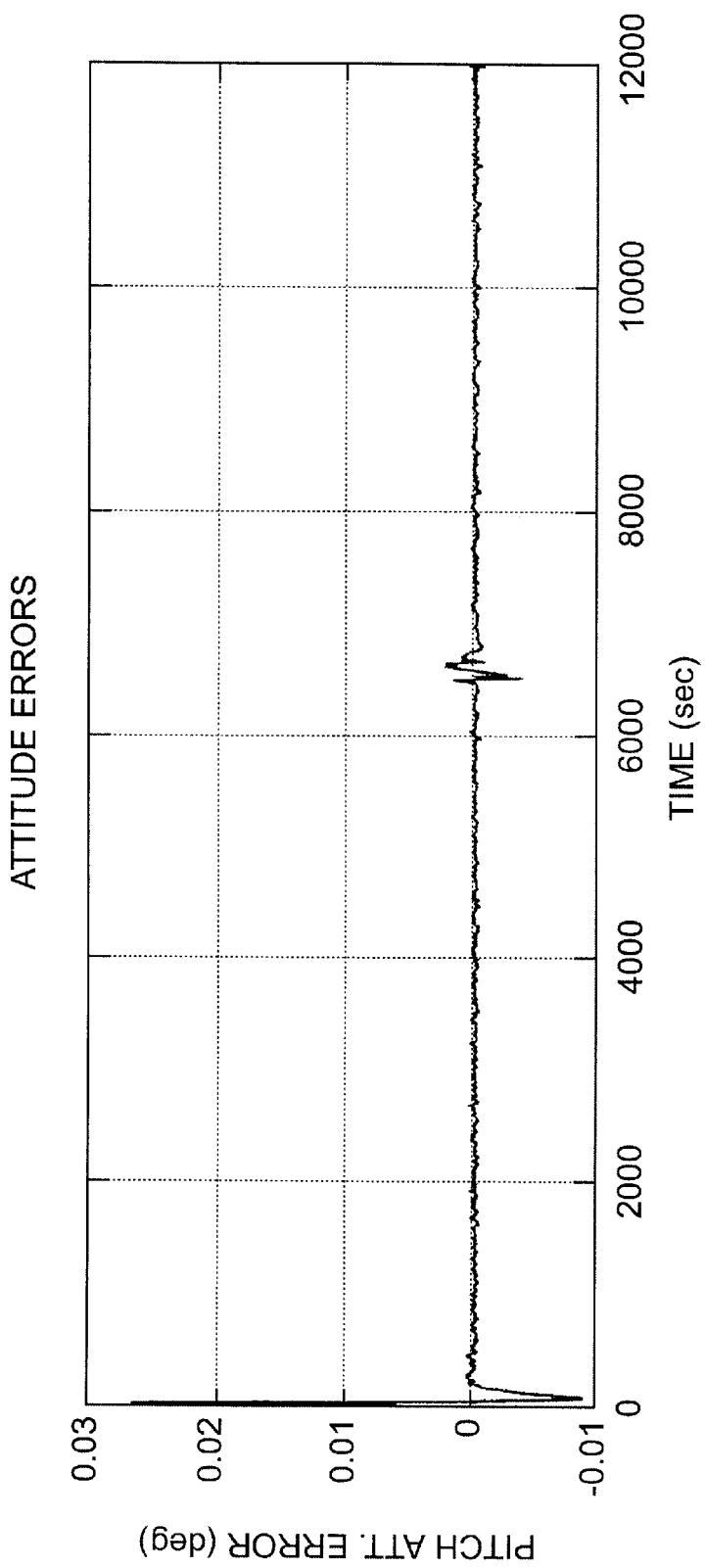
Figure 7A:
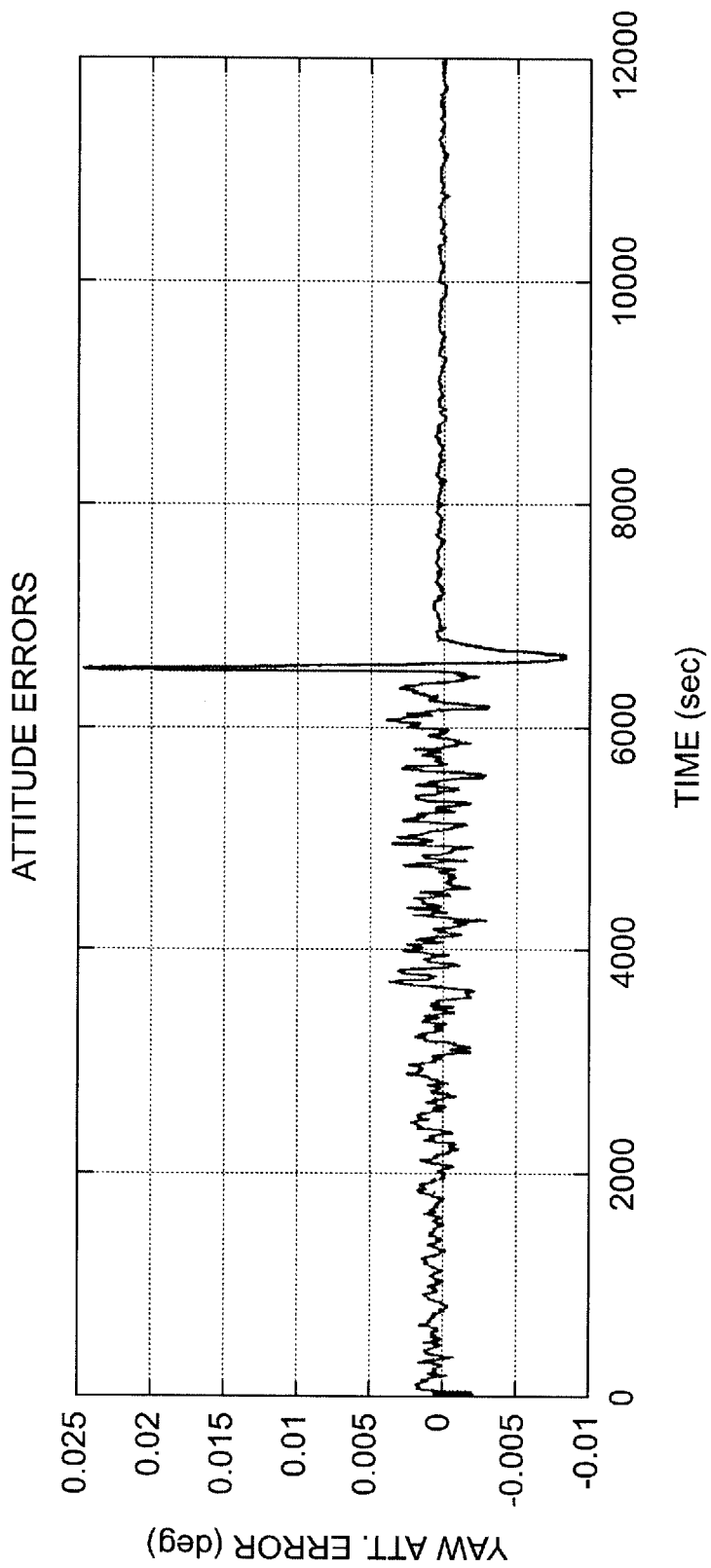
FIGS. 7a, 7b, and 7c represent graphs illustrating relationships between body yaw, body roll, and body pitch attitude determination error and time, respectively, for a simulation in which the yaw attitude determination error has been reduced from about 0.4 degrees to about zero.
Figure 7B:
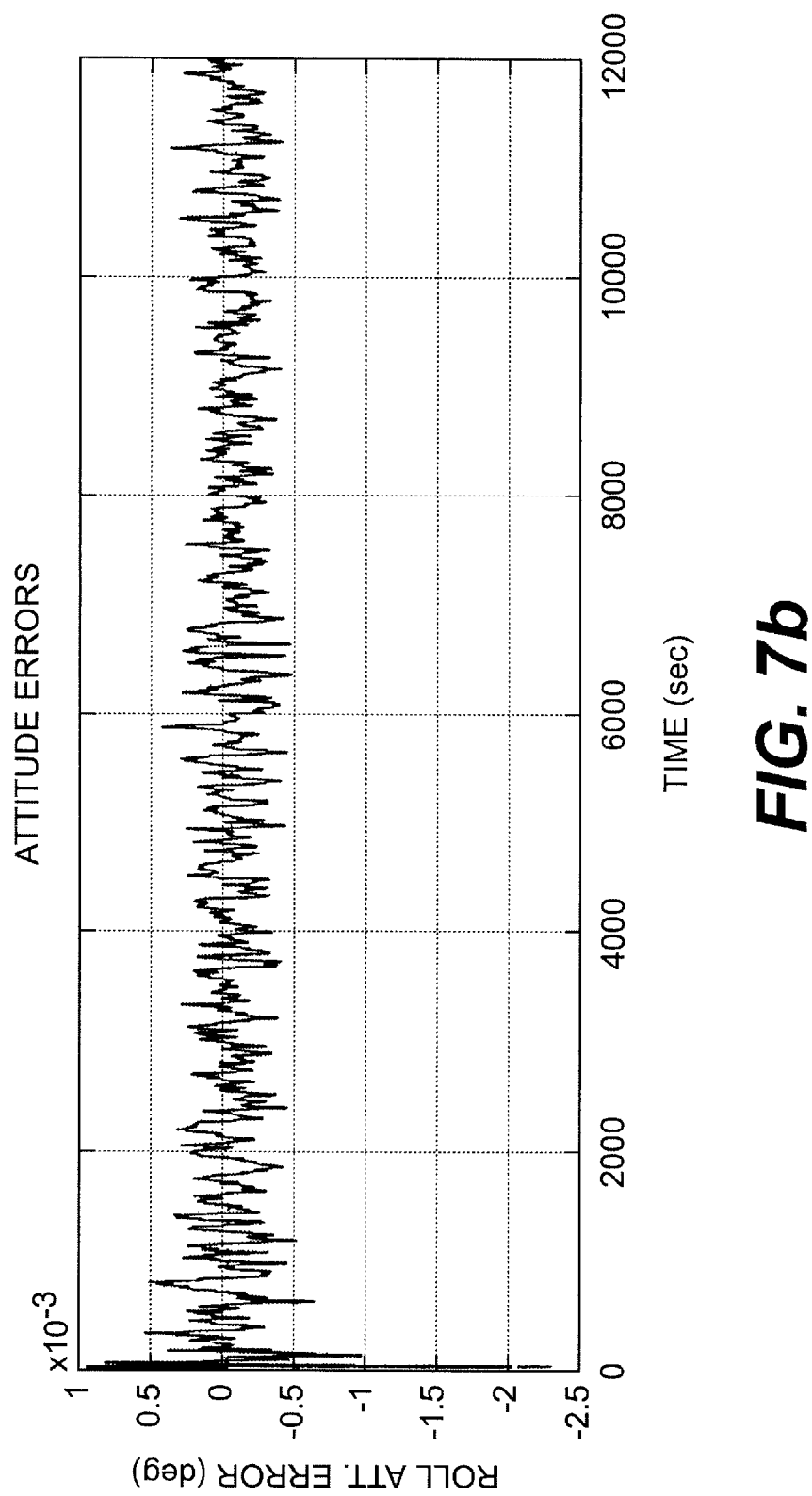
Figure 7C:
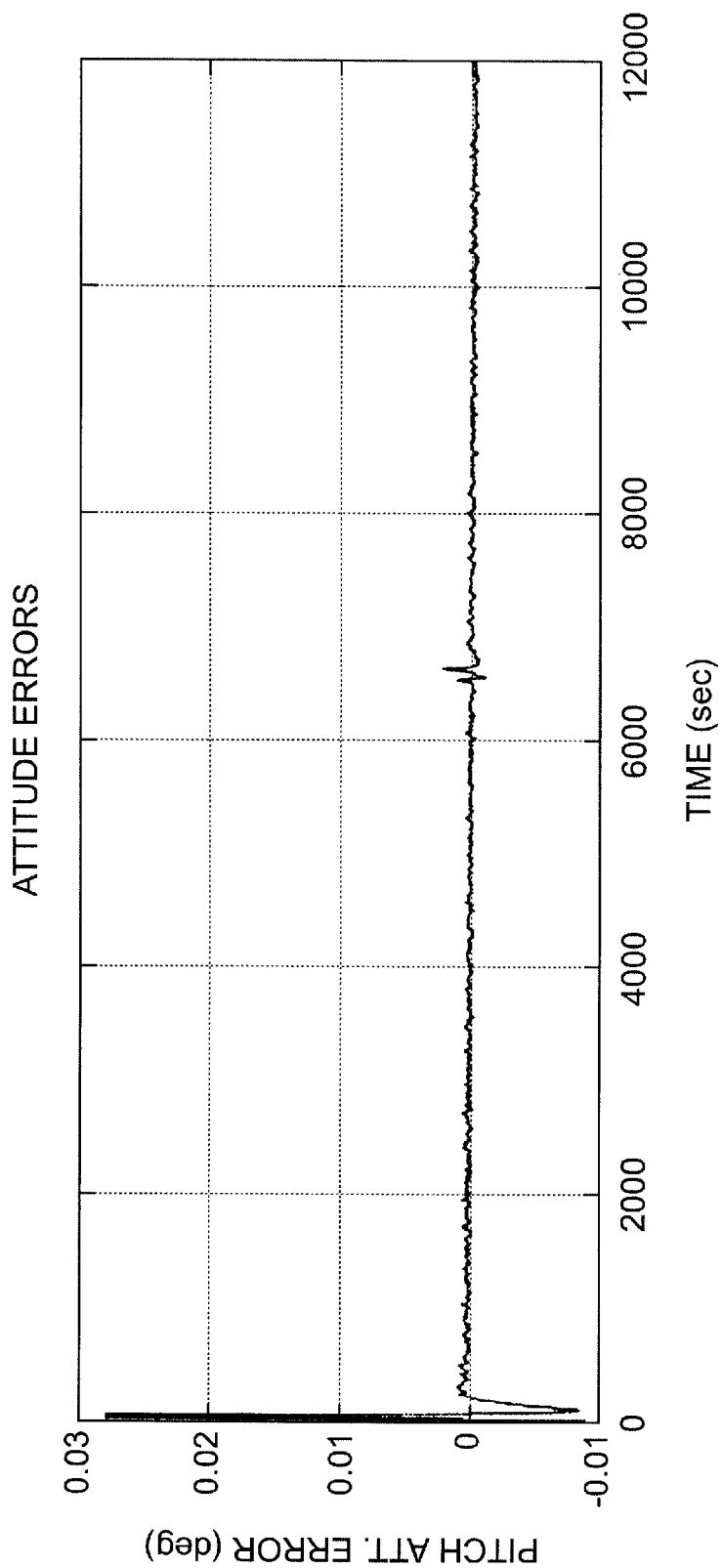

The following describes and FIGS. 5–8 help to illustrate two test cases that demonstrate the performance of the invention. Case 1 includes a baseline simulation run where an error in roll direction of about 0.2 degrees is added to the SSA alignment. The discrepancy between SSA and ESA alignment causes conflicting output from the two sensors and results in a large SSA elevation residual. The residual is used to update yaw attitude and causes a large attitude determination error in yaw, as shown in FIG. 5, and an attitude transient of about 0.4 degrees at the beginning of the Sun update window, as shown in FIG. 6.

Figure 8A:
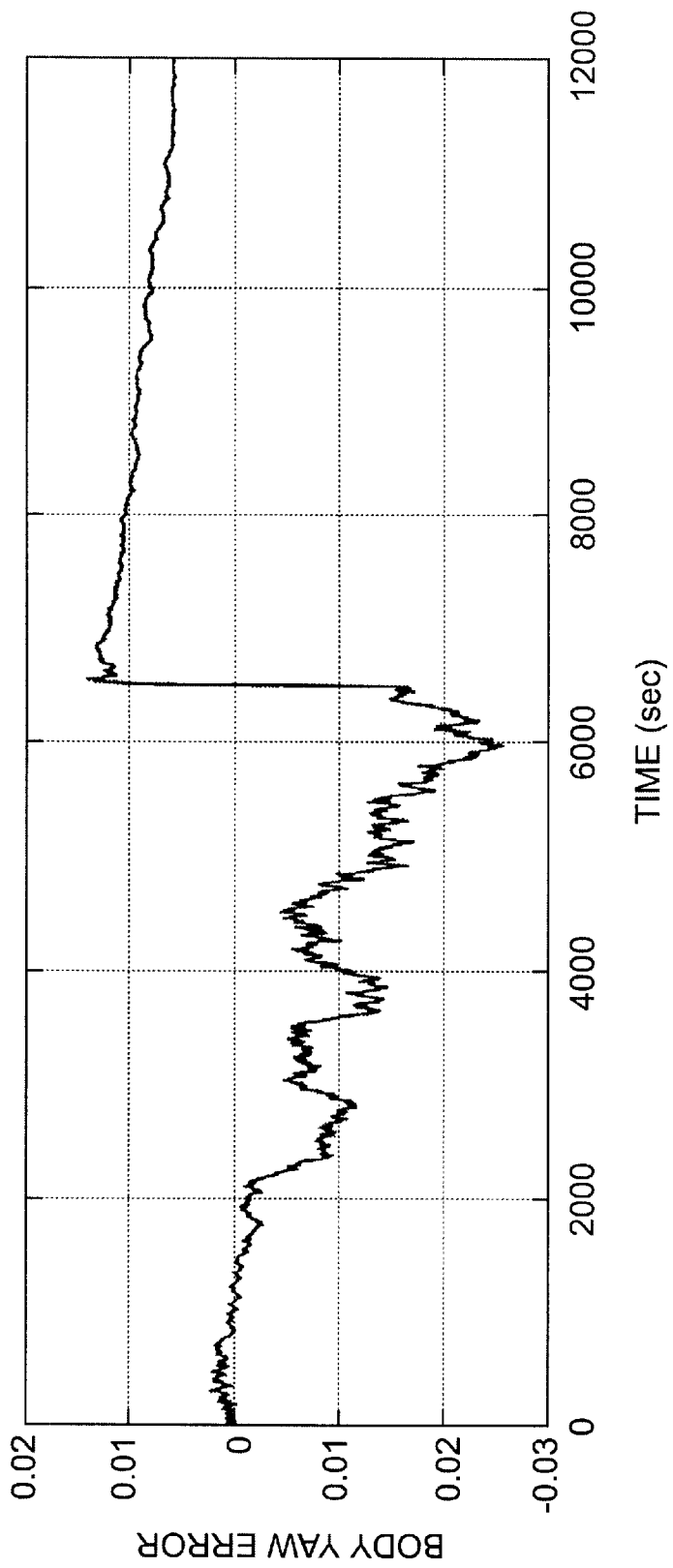
FIGS. 8a, 8b, and 8c represent graphs illustrating relationships between body yaw, body roll and body pitch attitude control error and time, respectively, utilizing an embodiment of an attitude update logic according to the present invention.
Figure 8B:
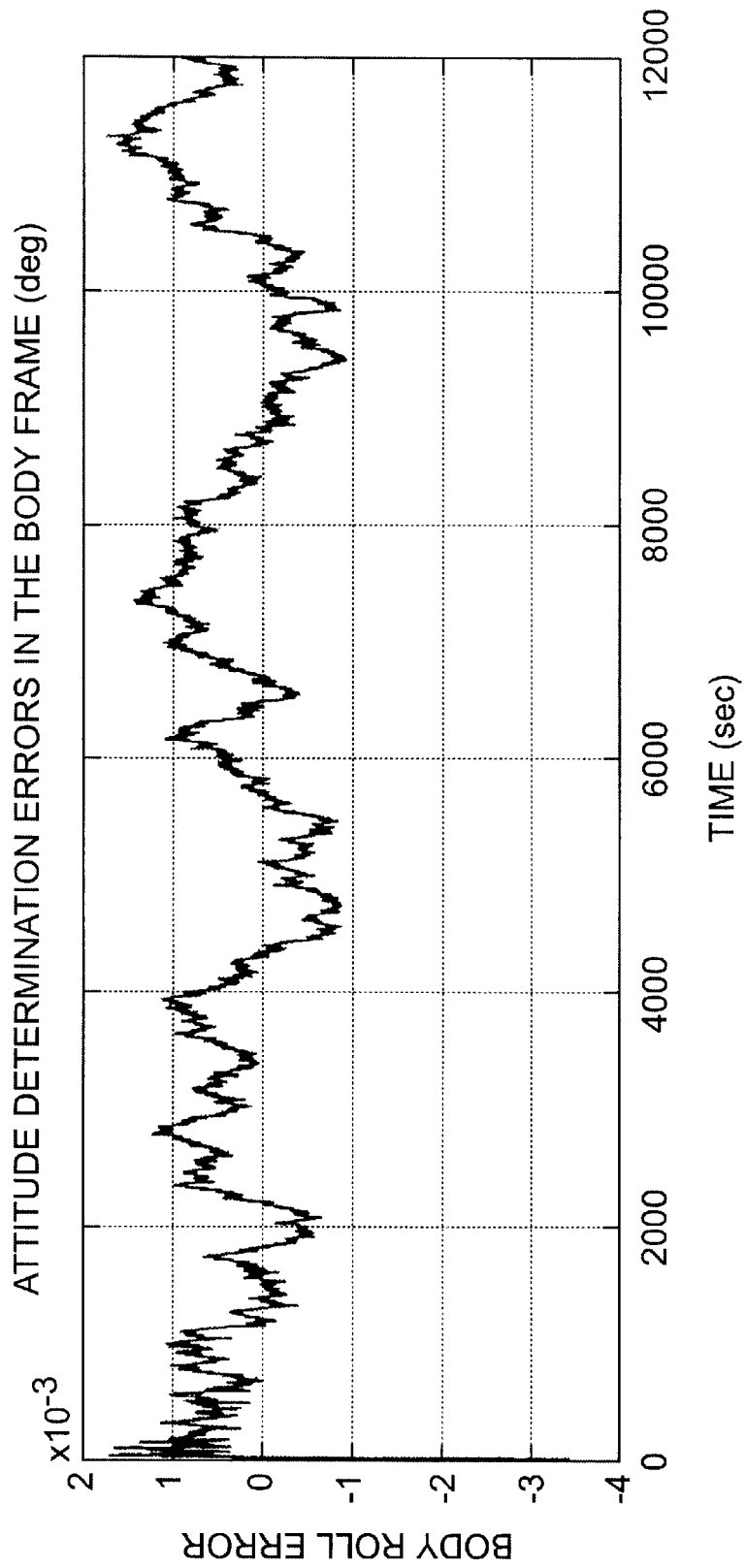
Figure 8C:
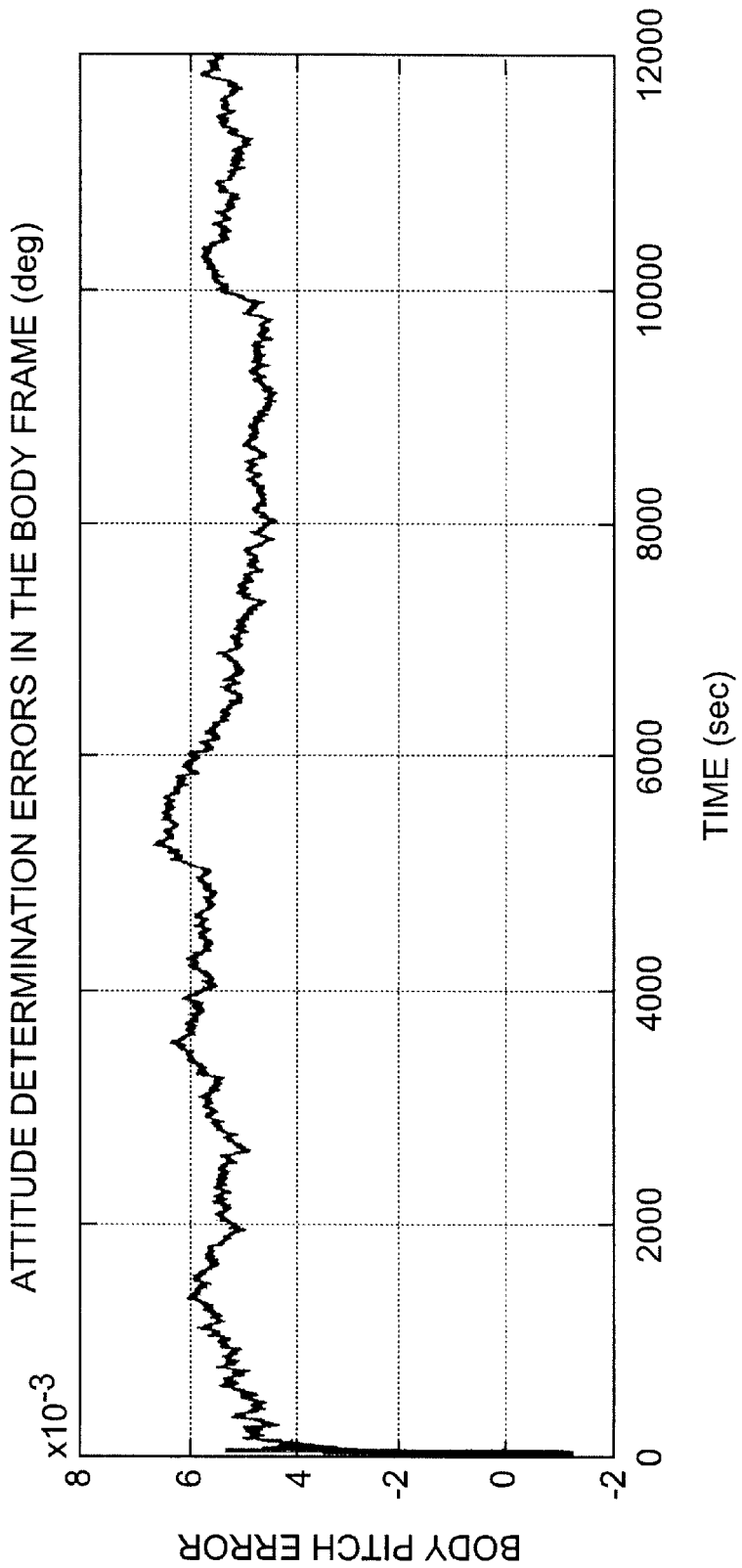

Case 2 demonstrates that a major improvement in yaw pointing is achieved by turning on the alignment correction logic. As shown in the graphs illustrated in FIGS. 7a, 7b, and 7c, the attitude transient in yaw axis is reduced to about 0.025 degrees from about 0.4 degrees. The attitude determination error in yaw is also reduced by the same magnitude as represented in FIGS. 8a, 8b, and 8c. With the correction, the roll to yaw coupling caused by the SSA roll alignment uncertainty relative to the ESA is eliminated, and the SSA elevation residual is only used to correct the yaw attitude determination error caused by the gyro drift.

The present invention provides an on-board SSA misalignment estimation and correction system. This system is very effective in eliminating the roll to yaw coupling caused by the misalignment of the SSA relative to the ESA. With this system, the daily yaw attitude transient can be significantly reduced.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

We claim:

1. A method for correcting differences in measurements between sensors, the method comprising:
    estimating misalignment of a roll error of a sun sensor alignment with respect to a reference roll value measured by an earth sensor;

calculating sun sensor assembly elevation angle residual utilizing the estimated sun sensor assembly roll misalignment; and updating a yaw attitude of a spacecraft based upon the calculated sun sensor assembly elevation residual.

2. The method according to claim 1, further comprising:

updating gyro biases of the spacecraft based upon the calculated sun sensor assembly elevation residual.

3. The method according to claim 1, wherein the method is carried out once each day processing collected data as a batch.

4. The method according to claim 1, wherein estimating roll error of the sun sensor alignment comprises:

calculating a matrix of sun sensor assembly elevation residuals;

calculating a sensitivity matrix comprising the sine and cosine of a sun vector angle in the yaw/roll plane from a minus yaw axis; and calculating a matrix of attitude determination errors in the spacecraft utilizing said sun sensor assembly elevation residuals.

5. The method according to claim 1, wherein the misalignment is calculated recursively utilizing current elevation residual.

6. The method according to claim 1, wherein calculating the sun sensor assembly misalignment reduces the influence of previous elevation residuals by a forgetting factor.

7. The method according to claim 1, wherein the yaw attitude is updated with an extended Kalman filter.

8. The method according to claim 1, wherein the method is performed daily.

9. The method according to claim 1, wherein the method is performed once each day.

10. The method according to claim 1, wherein the method is performed when the sun is in the sun sensor assembly field of view.

11. The method according to claim 1, wherein the spacecraft is in geosynchronous orbit.

12. The method according to claim 1, wherein the spacecraft is not in a geosynchronous orbit.

13. A spacecraft attitude control system, comprising:

a controller operable to estimate misalignment of a roll error of a sun sensor alignment with respect to a reference roll value measured by an earth sensor, calculate sun sensor assembly elevation angle residual utilizing the estimated sun sensor assembly roll misalignment, and update a yaw attitude of the spacecraft based upon the calculated sun sensor assembly elevation residual.

* * * * *